(12) United States Patent
Owada

(10) Patent No.: US 7,744,801 B2
(45) Date of Patent: Jun. 29, 2010

(54) 3D MODELING DEVICE AND 3D MODELING METHOD FOR SUPPLYING MATERIAL WITH HIGH PRECISION

(75) Inventor: Koji Owada, Hamamatsu (JP)

(73) Assignee: Roland DG Corporation, Hamamatsu-shi (JP)

( * ) Notice: Subject to any disclaimer, the term of this patent is extended or adjusted under 35 U.S.C. 154(b) by 1108 days.

(21) Appl. No.: 11/085,980

(22) Filed: Mar. 22, 2005

(65) Prior Publication Data
US 2005/0248065 A1 Nov. 10, 2005

(30) Foreign Application Priority Data
May 7, 2004 (JP) ............... 2004-138315

(51) Int. Cl.
*B29C 35/08* (2006.01)
*B29C 41/02* (2006.01)

(52) U.S. Cl. ..................... 264/401

(58) Field of Classification Search ............... 264/308, 264/401
See application file for complete search history.

(56) References Cited

U.S. PATENT DOCUMENTS

| | | | | |
|---|---|---|---|---|
| 5,059,266 | A * | 10/1991 | Yamane et al. | 264/308 X |
| 5,510,066 | A * | 4/1996 | Fink et al. | 264/40.1 |
| 6,164,850 | A * | 12/2000 | Speakman | 400/120.09 |
| 6,238,614 | B1 * | 5/2001 | Yang et al. | 264/497 |
| 2004/0099983 | A1 * | 5/2004 | Dirscherl | 264/308 X |
| 2004/0175451 | A1 * | 9/2004 | Maekawa et al. | 425/144 |

FOREIGN PATENT DOCUMENTS

WO WO-0242056 A1 * 3/2002

* cited by examiner

*Primary Examiner*—Leo B Tentoni
(74) *Attorney, Agent, or Firm*—Ditthavong Mori & Steiner, P.C.

(57) ABSTRACT

A 3D modeling device performs repeatedly a step of cutting a subsidiary material layer formed of a subsidiary material and cutting a modeling material layer formed of a modeling material. The 3D modeling device comprises at least one of a subsidiary material supplying device which discharges the subsidiary material drop by drop from an outlet positioned apart from a region in which the subsidiary material is to be applied at a predetermined distance, and a modeling material supplying device which discharges the modeling material drop by drop from an output positioned apart from a region in which the modeling material is to be applied at a predetermined distance. Since the material can be applied with high precision, a high-quality 3D molded object is provided.

11 Claims, 9 Drawing Sheets

3D OBJECT

PROTRUDED PART

REGION TO BE APPLIED

MODELING MATERIAL

NOZZLE

WORK TABLE

MODELING MATERIAL

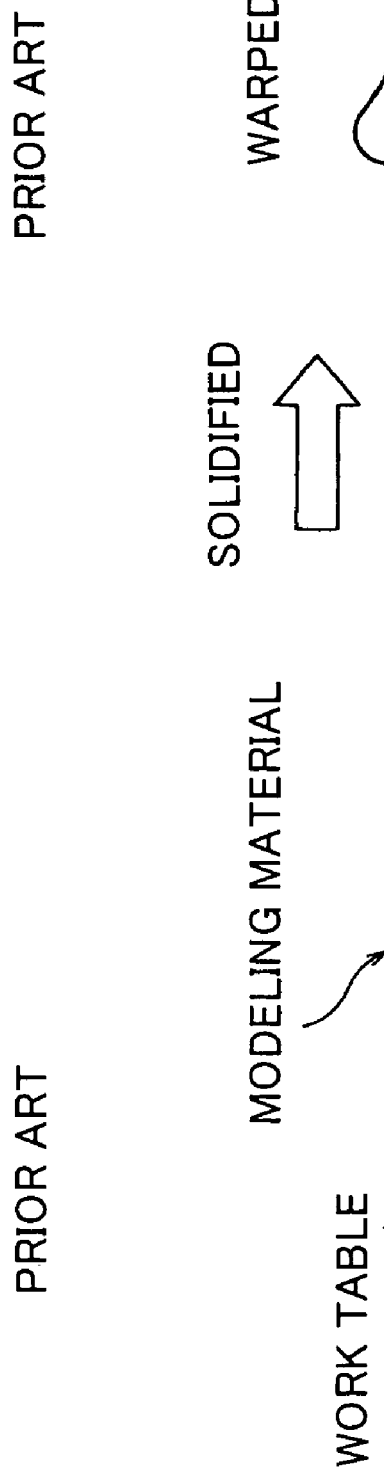
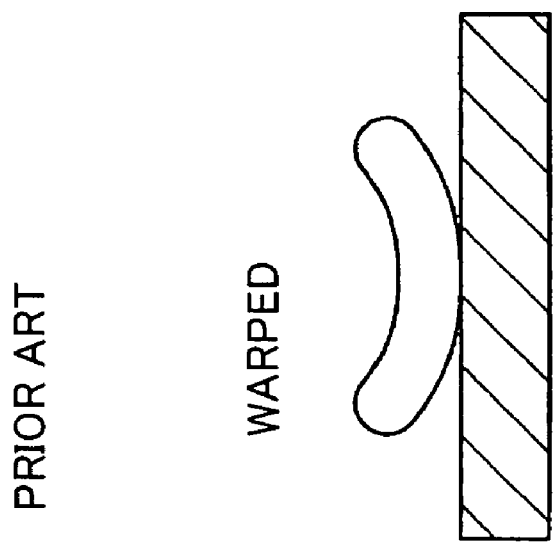

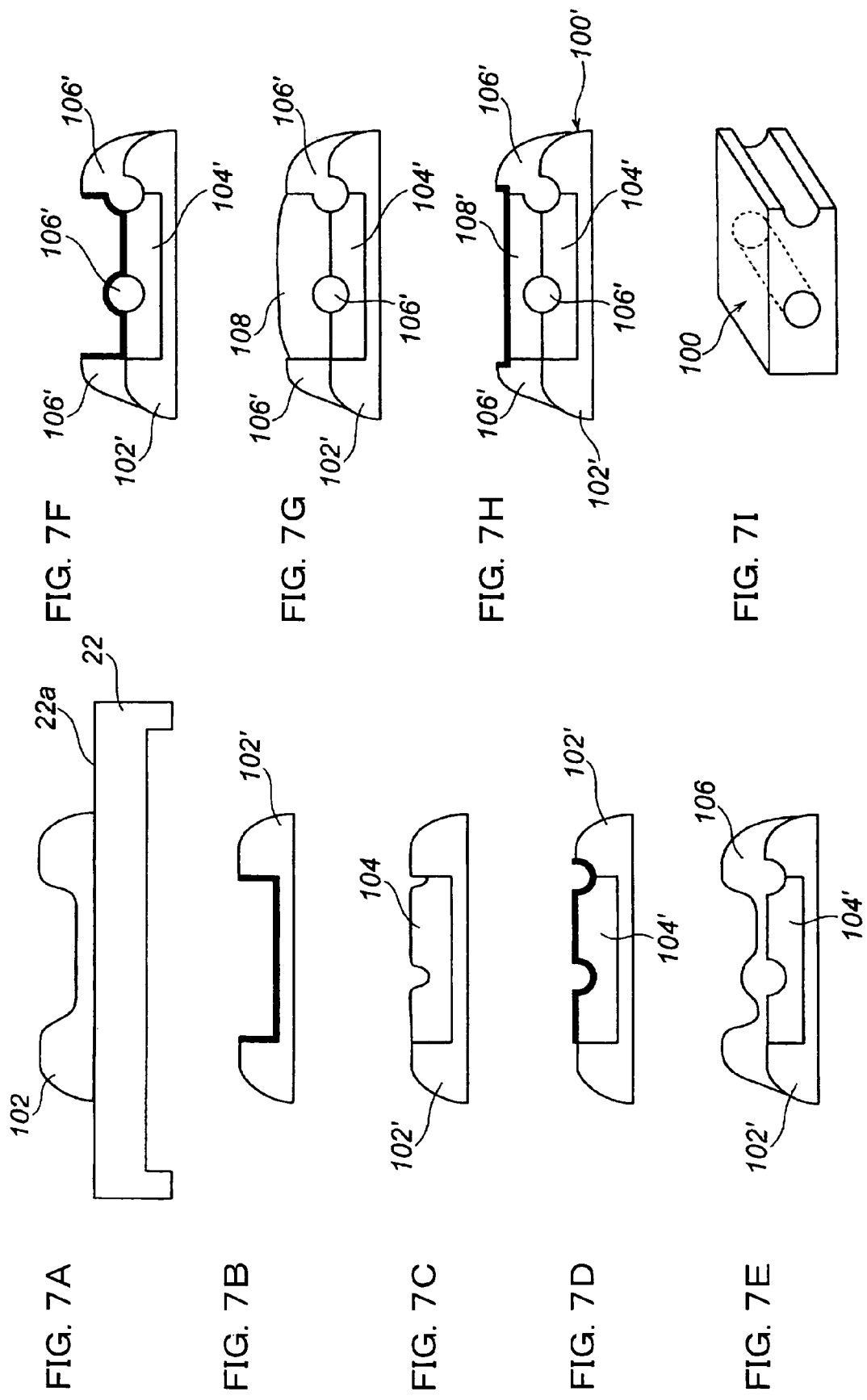

3D MODELING DEVICE AND 3D MODELING METHOD FOR SUPPLYING MATERIAL WITH HIGH PRECISION

BACKGROUND OF THE INVENTION

1. Field of the Invention

The present invention relates to a 3D modeling device and a 3D modeling method and more particularly, it relates to a 3D modeling device and a 3D modeling method which makes a 3D object by depositing a subsidiary material layer formed of a subsidiary material and a modeling material layer formed of a modeling material.

2. Description of the Background Art

Conventionally, when a desired 3D object is made of a modeling material such as a resin, the modeling material is applied linearly from a nozzle as shown in FIG. 1A or a large amount of modeling material is applied at the same time as shown in FIG. 2A.

When a 3D object such as an almost triangle-shaped wall shown in FIG. 1B is made by a conventional linear application method in which a modeling material is applied from a nozzle linearly, for example, since the modeling material is applied from the nozzle linearly while the tip end of the nozzle is considerably close to a worktable (refer to a view shown in FIG. 1A), the nozzle could be damaged because it comes in touch with the worktable.

In addition, according to the conventional linear application method, ends of the linearly applied modeling material protrude from a predetermined region in which the modeling material is to be applied (a part shown by a hatching in FIG. 1C is the protruded part), so that the modeling material is wasted.

Meanwhile, according to a conventional pouring application method in which a large amount of modeling material is applied at the same time, since the large-volume modeling material is solidified at the same time, expansion and contraction at the time of the solidification considerably affect a 3D object to cause warpage in the completed 3D object (refer to FIG. 2B). As a result, the quality of the completed 3D object deteriorates.

SUMMARY OF THE INVENTION

It is an object of the present invention to provide a 3D modeling device which can make a high-quality 3D object.

It is another object of the present invention to provide a 3D modeling method which can make a high-quality 3D object.

A 3D modeling device according to the present invention comprises a subsidiary material supplying unit for supplying a subsidiary material, a modeling material supplying unit for supplying a modeling material, a processing machine for processing a subsidiary material layer formed of the subsidiary material and a modeling material layer formed of the modeling material, and a controller for controlling the processing machine so that the subsidiary material layer and the modeling material layer are repeatedly processed. At least one of the subsidiary material and the modeling material is supplied in the form of dots.

Since at least one of the subsidiary material and the modeling material is supplied in the form of dots, the material can be applied with high precision.

As a result, a high-quality 3D object can be provided.

According to another aspect of the present invention, a 3D modeling device comprises a subsidiary material supplying unit for supplying a subsidiary material, a modeling material supplying unit for supplying a modeling material, a processing machine for processing a subsidiary material layer formed of the subsidiary material and a modeling material layer formed of the modeling material, and a controller for controlling the processing machine so that the subsidiary material layer and the modeling material layer are repeatedly processed. Either the subsidiary material supplying unit or the modeling material supplying unit discharges the subsidiary material or the modeling material drop by drop from an outlet which is positioned apart from a region where the subsidiary material or the modeling material to be applied at a prescribed distance.

Preferably, the subsidiary material discharged from the outlet of the subsidiary material supplying unit is a low melting point alloy and the 3D modeling device comprises a storing part for storing the low melting point alloy and a heater for heating up the storing part.

More preferably, the modeling material is a light-curing resin which is cured by irradiation of light and the 3D modeling device comprises a light irradiating unit arranged lower than the outlet of the modeling material supplying unit and irradiates the modeling material supplied to the region in which the modeling material is to be applied, with light to cure the light-curing resin.

According to still another aspect of the present invention, a 3D modeling method comprises a step of repeatedly cutting a subsidiary material layer formed of a subsidiary material and cutting a modeling material layer formed of a modeling material and a step of removing the subsidiary material to form a 3D object formed of the modeling material. At this time, at least one of the subsidiary material constituting the subsidiary material layer and the modeling material constituting the modeling material layer is supplied in the form of dots.

According to still another aspect of the present invention, a 3D modeling method comprises a step of repeatedly cutting a subsidiary material layer formed of a subsidiary material and cutting a modeling material layer formed of a modeling material and a step of removing the subsidiary material to form a 3D object formed of the modeling material At this time, the subsidiary material is supplied in the form of dots constituting the subsidiary material layer, a light-curing resin is supplied in the form of dots as the modeling material constituting the modeling material layer, and the supplied dot-shaped light-curing resin is irradiated with light.

Preferably, the subsidiary material is a low melting point alloy heated up to a predetermined temperature.

Still preferably, a light-curing resin is deposited in the form of dots with space and then the space is filled with the light-curing resin in the form of dots.

BRIEF DESCRIPTION OF THE DRAWINGS

FIG. 2A and FIG. 2B are views showing a conventional pouring application method;

FIGS. 7A to 7I are views sequentially showing steps of forming a 3D object shown in FIG. 7I according to the present invention;

DESCRIPTION OF THE PREFERRED EMBODIMENTS

An embodiment of a 3D modeling device and a 3D modeling method is described in detail with reference to the accompanying drawings hereinafter.

Figure 3:
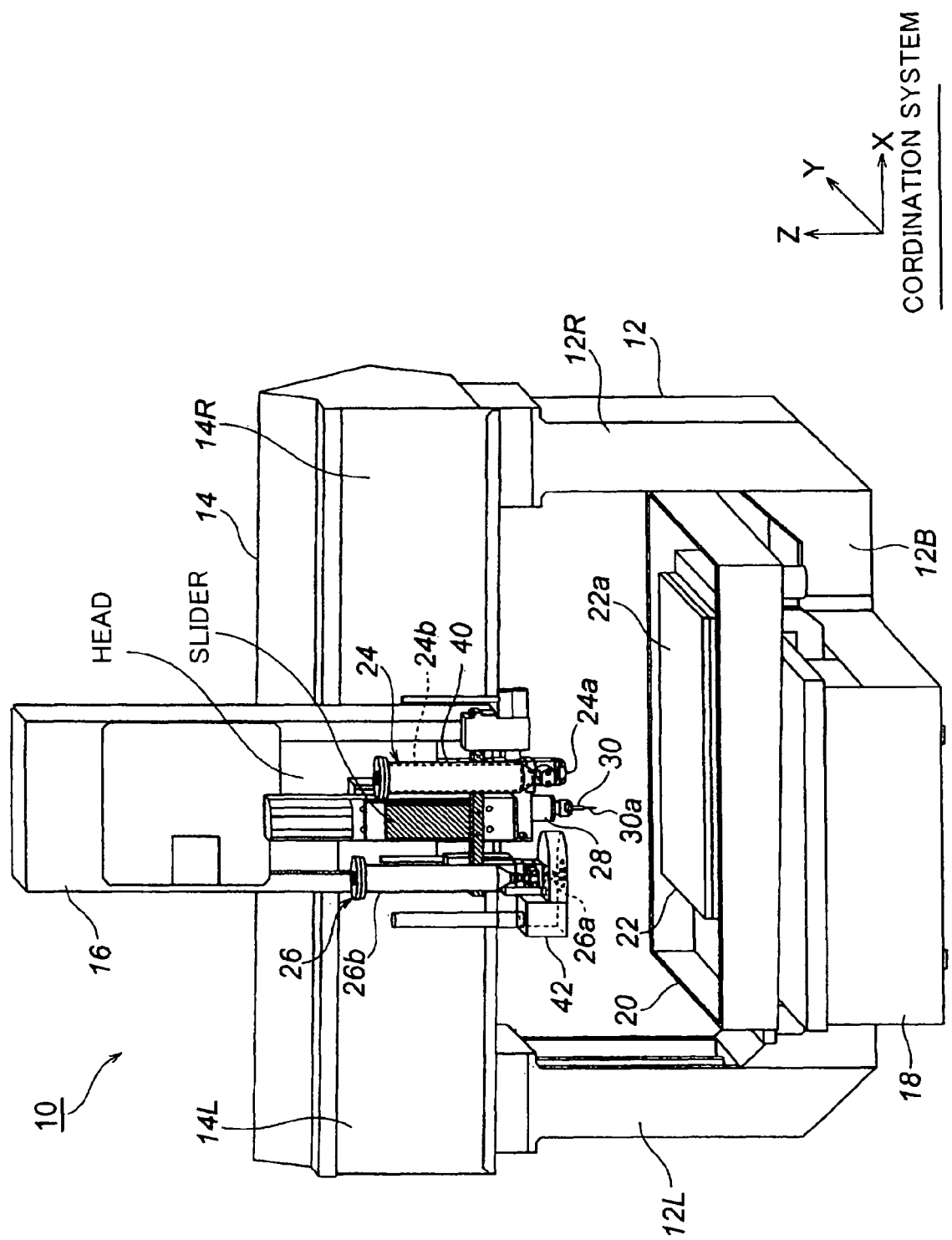
FIG. 3 is a schematic view showing a constitution of a 3D modeling device according to an embodiment of the present invention.

FIG. 3 is a schematic view showing a 3D modeling device according to one embodiment of the present invention. Referring to FIG. 3, the 3D modeling device 10 comprises a pair of support parts 12L and 12R which are extended vertically and have the shape of square pole, and a bottom part 12B which connects the support parts 12L and 12R, so that those parts form a U-shaped arm 12. In addition, the 3D modeling device 10 comprises a rail 14 provided at an upper part of the pair of support parts 12L and 12R, and a carriage 16 provided so as to be movable on the rail 14 within a predetermined range in the X-direction in a X-Y-Z orthogonal coordination system (refer to FIG. 3 showing the coordination system).

A spindle 28 is fixed to a head (refer to FIGS. 3 and 5) which is provided adjacent to the carriage 16 and movable within a predetermined range in the Z-direction with respect to the carriage 16. Furthermore, a slider (shown by a shaded area in FIGS. 3 and 5) which is movable within a predetermined range in the Z-direction is provided above the spindle 28, and a dispenser 24 which discharges a subsidiary material and a dispenser 26 which discharges a modeling material are provided.

A table 22 which is movable within a predetermined range in the Y-direction is provided above a frame plate 18 which is extended in the Y-direction and has the shape of almost rectangular at the bottom part 12B of the U-shaped arm 12.

A collection box 20 which collects machined powder and the like is provided around an outer periphery of the table 22 so as to surround the table 22, and the collection box 20 is connected to a collection tank (not shown) through a drain pipe (not shown).

An upper face 22a of the table 22 is horizontally flat and a 3D object is formed by depositing a subsidiary material layer formed of the subsidiary material and a modeling material layer formed of the modeling material on this upper face 22a.

An entire operation of the 3D modeling device 10 is controlled by a microcomputer. Thus, the dispensers 24 and 26 and the spindle 28 are moved in the Z-direction along with the movement of the head and moved in the X-direction along with the movement of the carriage 16 depending on a predetermined resolution by the microcomputer.

The table 22 is moved in the Y-direction together with the collection box 20.

Therefore, the dispensers 24 and 26 an end mill 30 supported by the spindle 28 and the 3D object formed on the upper face 22a of the table 22 can be moved in any direction of the X-Y-Z-directions with a relative positional relation among them is kept.

Figure 4:
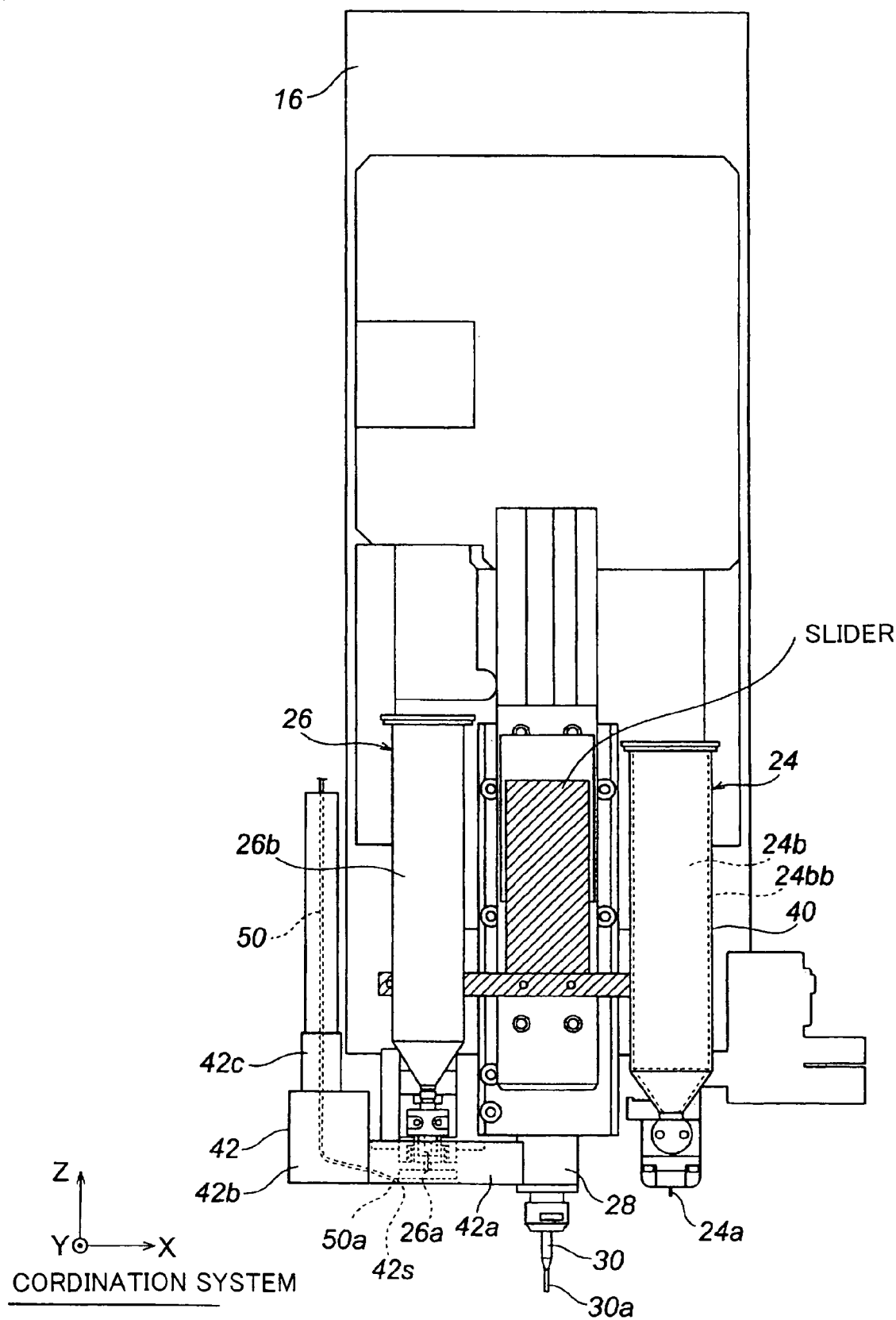
FIG. 4 is an enlarged front view showing a carriage part of the 3D modeling device shown in FIG. 3.
Figure 5:
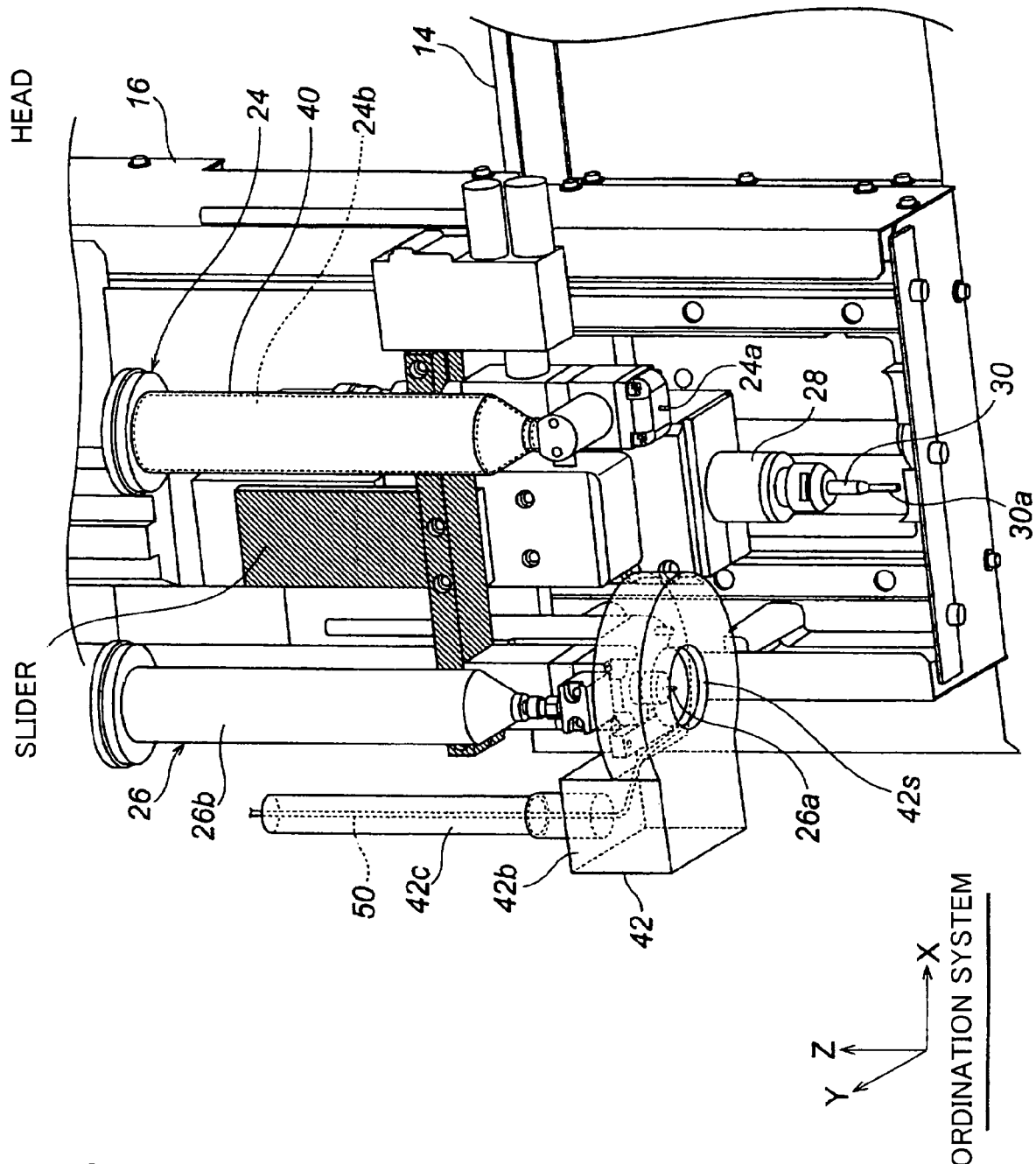
FIG. 5 is an enlarge perspective view showing the carriage part of the 3D modeling device shown in FIG. 3.

FIG. 4 is an enlarged schematic front view showing the carriage 16 of the 3D modeling device 10 shown in FIG. 3. FIG. 5 is an enlarged schematic perspective view showing the carriage 16 of the 3D modeling device 10 shown in FIG. 3. Referring to FIGS. 4 and 5, the 3D modeling device is described in detail hereinafter.

The dispenser 24 is so designed that the subsidiary material contained in a tank (not shown) is supplied and a heater 40 is provided around an outer periphery 24bb of a syringe 24b which stores the subsidiary material supplied from the tank (not shown) over a whole length of a syringe 24b. Therefore, the subsidiary material stored inside the syringe 24b can be heated up by the heater 40 to a predetermined temperature by heating up the syringe 24b which stores the subsidiary material.

According to this embodiment, as the subsidiary material, metal, especially a low melting point alloy is used.

For example, when a low melting point alloy which does not contain so-called harmful materials and comprises 57.5% of bismuth (Bi), 17.3% of tin (Sn) and 25.2% of indium (In) and melts at 78.8° C. is used, the low melting point alloy stored in the syringe 24b is heated up to approximately 100° C. by heating up the syringe 24b by the heater 40.

Thus, the low melting point alloy is heated up to the predetermined temperature by the heater 40 and melts in the syringe 24b and it is discharged drop by drop from an outlet 24a which is connected to the syringe 24b and positioned at a tip end of the dispenser 24. Thus, a predetermined amount of the low melting point alloy discharged from the outlet 24a of the dispenser 24 drops on a predetermined position.

The dispenser 26 is so designed that the modeling material contained in a tank (not shown) is supplied thereto. The modeling material is discharged drop by drop from an outlet 26a which is connected to the syringe 26b storing the modeling material supplied from the tank (not shown) and positioned at a tip end of the dispenser 26. Thus, a predetermined amount of the modeling material discharged from the output 26a of the dispenser 26 is controlled so as to drop on a predetermined position.

In addition, according to this embodiment, as the modeling material, an ultraviolet-curing resin, especially an ultraviolet-curing resin which is insoluble in water is used. This ultraviolet-curing resin is cured when it is irradiated with ultraviolet rays.

Furthermore, a light guide member 42 is arranged so as to be positioned around an outer periphery of the outlet 26a of the dispenser 26. The light guide member 42 is formed of aluminum and comprises a disk-shaped body part 42a, and a lead-in tube 42c extended from a connection part 42b which is positioned at an outer periphery of the body part 42a.

Figure 6A:
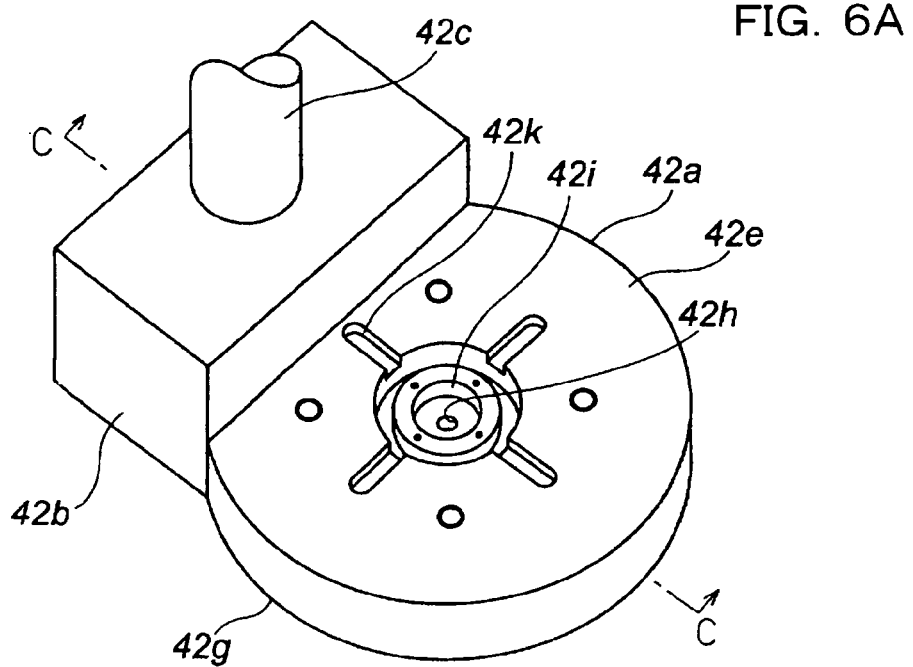
FIG. 6A is a schematic perspective view showing a body part of a light guide member mainly.
Figure 6B:
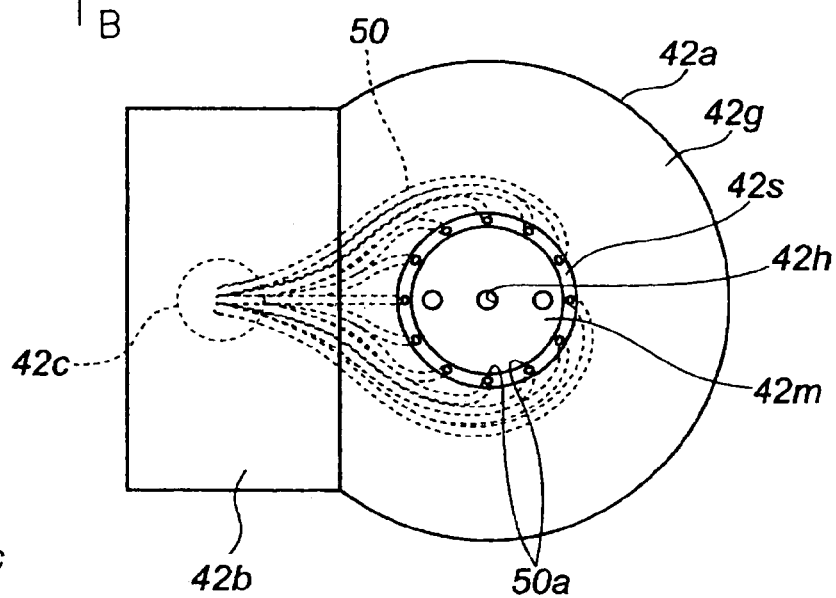
FIG. 6B is a fragmentary schematic view (bottom view) taken in the direction of arrow B of FIG. 6A.
Figure 6C:
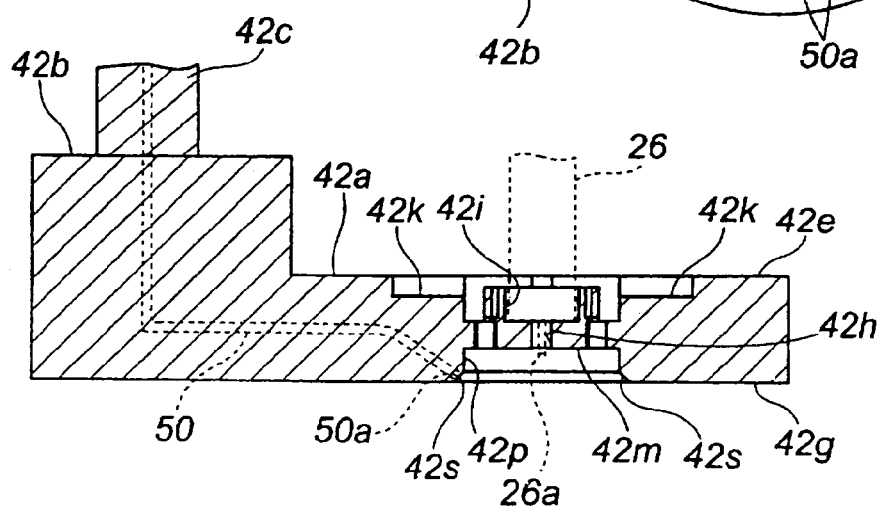
FIG. 6C is a sectional view taken along line C-C of FIG. 6A.

FIG. 6A is a schematic perspective view mainly showing the body part 42a of the light guide member 42. FIG. 6B is a schematic fragmentary view taken in the direction of an arrow B of FIG. 6A. FIG. 6C is a sectional view taken along line C-C of FIG. 6A.

There is provided a through hole 42h almost in the center part of the body part 42a, which penetrates from an upper face 42e of the body part 42a to a lower face 42g of the body part 42a (refer to FIG. 6C).

A side face 42p extended from an outer edge of a bottom face of a lower recess 42m forms an inclined plane 42s which radiates out from the center of the through hole 42h and has a predetermined inclination.

Optical fibers 50 for applying ultraviolet rays led in from the lead-in tube 42c of the light guide member 42 are designed such that they pass through the connection part 42b and their tip ends 50a are positioned on the inclined plane 42s (refer to FIGS. 4, 6B and 6C). Therefore, the ultraviolet rays output from the tip ends 50a of the optical fibers 50 are applied in the shape of a ring of 360° and converged to a spot just under the through hole 42h.

Meanwhile, when the light guide member 42 is mounted around the outer periphery of the outlet 26a, the outlet 26a of the dispenser 26 is arranged in the through hole 42h (refer to the dispenser 26 shown by broken lines in FIG. 6C), and various kinds of dimensions are set so that the inclined plane 42s of the light guide member 42 may be positioned on the lower side from the outlet 26a of the dispenser 26 in the Z-direction.

Therefore, as described above, the ultraviolet-curing resin applied to the predetermined position from the outlet 26a of the dispenser 26 is cured by the ultraviolet rays output from the light guide member 42.

The end mill 30 is rotated around an the axis line by a motor (not shown) and the subsidiary material layer formed of the subsidiary material and the modeling material layer formed of the modeling material are cut by a cutting part 30a.

In the above-described constitution, when a 3D object 100 shown in FIG. 7I is formed by the 3D modeling device 10, the subsidiary material, that is, the low melting point alloy which is heated up to the predetermined temperature is discharged from the outlet 24a of the dispenser 24 which is positioned apart from the upper face 22a of the table 22 at a predetermined distance (refer to a distance W1 shown in FIG. 8A) and positioned lower than the cutting part 30a of the spindle temporally by controlling position of the slider under control of the microcomputer based on predetermined data. The low melting point alloy discharged from the outlet 24a of the dispenser 24 drops in the form of dots on a predetermined position on the upper face 22a of the table 22 where the low melting point alloy is to be applied.

Thus, the low melting point alloy is supplied precisely and sequentially in line in the form of dots in the region where the alloy is to be applied, so that a 3D configuration (refer to FIG. 8B) whose cut amount by the end mill 30 is minimized is provided. Then, it is cooled down naturally and solidified to form a subsidiary material layer 102 (refer to FIG. 7A).

The subsidiary material layer 102 formed of the subsidiary material such as the low melting point alloy is cut by the cutting part 30a of the end mill 30 (refer to FIG. 7B). FIG. 7B shows a subsidiary material layer 102' after the subsidiary material layer 102 (refer to FIG. 7A) is machined by the end mill 30, and a boundary line of the subsidiary material layer 102' having the predetermined 3D configuration cut by the end mill 30 is shown by a heavy line.

Machined powder generated when the cutting part 30a of the end mill 30 cuts the subsidiary material layer 102 is flushed with water supplied from the vicinity of the tip end of the spindle by a feed-water system (not shown) and flows in the collection box 20 provided around the outer periphery of the table 22. The surface formed by the cutting operation is dried by removing water with air sprayed from an air nozzle (not shown).

After the surface of the subsidiary material layer 102' is cleaned up with water, the dispenser 26 is positioned apart from the surface of the subsidiary material layer 102' at a predetermined distance (refer to a distance W2 shown in FIG. 8C) and temporally positioned lower than the cutting part 30a of the spindle 28 by controlling position of the slider under control of the microcomputer based on predetermined data, the ultraviolet-curing resin which is the modeling material is discharged from the outlet 26a of the dispenser 26. The ultraviolet-curing resin discharged from the outlet 26a of the dispenser 26 drops on a predetermined position in the shape of dots on the surface of the subsidiary material layer 102' where the ultraviolet-curing resin is to be applied.

Figure 8A:
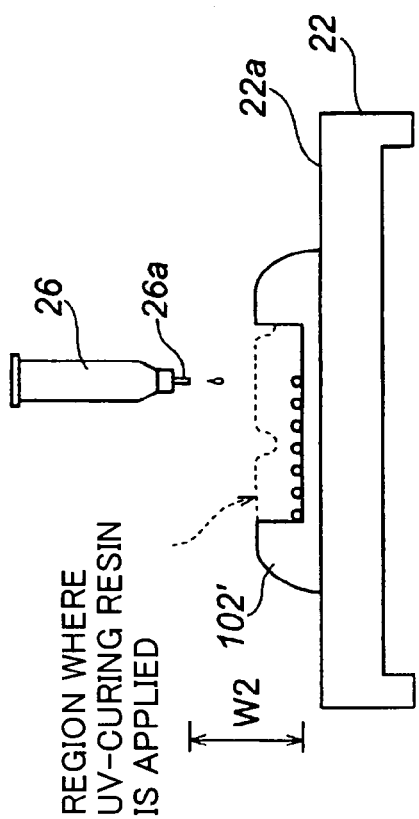
FIGS. 8A and 8B are schematic views for explaining supply of a subsidiary material.
Figure 8C:
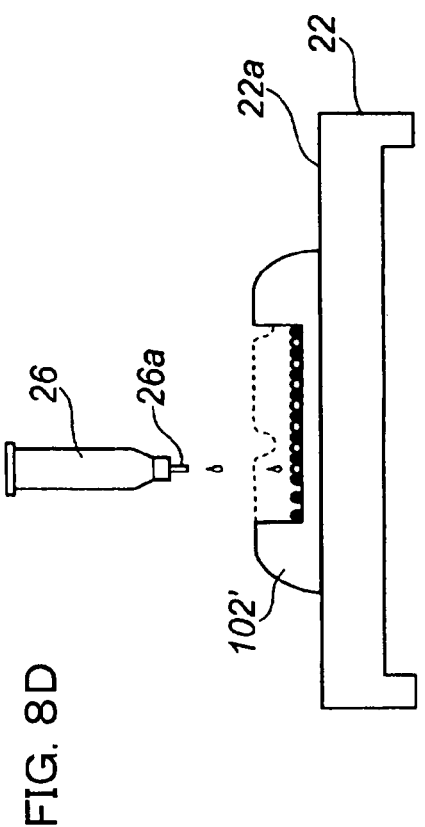
FIGS. 8C and 8D are schematic views for explaining supply of a modeling material.
Figure 8B:
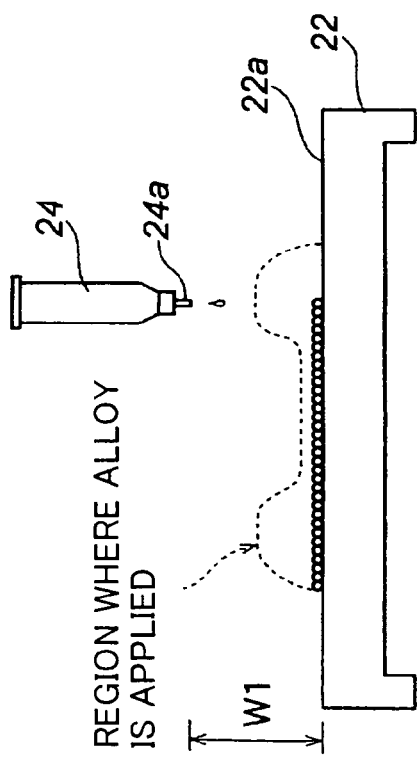
Figure 8D:
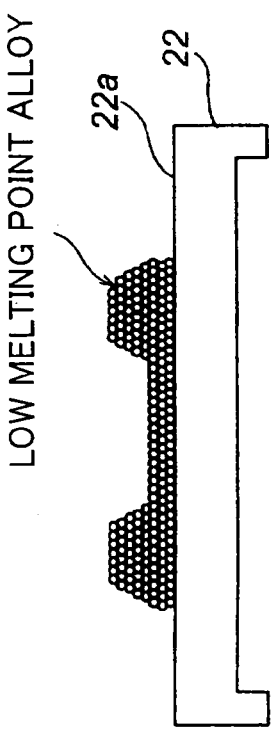

The ultraviolet-curing resin is applied on the region where the ultraviolet-hardening resin is to be applied so as to form dots at certain intervals (refer to FIG. 8C) and then the ultraviolet-curing resin is applied so as to fill in the dots which have been formed before (refer to black dots shown in FIG. 8D) with dots (refer to outlined dots shown in FIG. 8D). Thus, the ultraviolet-hardening resin is supplied precisely little by little on the region where it is to be applied so as to have a 3D configuration whose cut amount by the end mill 30 is minimized.

At this time, the ultraviolet rays output from the tip ends 50a of the optical fibers 50 are applied in the shape of the ring of 360° and converged to a spot just under an opening 42f of the through hole 42h (refer to FIG. 9A) by the light guide member 42 provided lower than the outlet 26a of the dispenser 26. Thus, when the surface where the ultraviolet-curing resin was discharged from the outlet 26a of the dispenser 26 is irradiated with the ultraviolet rays output from the optical fibers 50, the dot-shaped ultraviolet-curing resin is cured and a modeling material layer 104 is formed (refer to FIG. 7C).

Since the surface of the subsidiary material layer 102' which was cut by the end mill 30 is kept in an extremely clean state through the cleaning and drying, a foreign substance such as the machined powder is not mixed between the modeling material layer 104 which is integrally laminated on the subsidiary material layer 102' and the subsidiary material layer 102', so that the laminated layer can be provided with high precision.

Then, the modeling material layer 104 formed of the ultraviolet-curing resin which is the modeling material and the subsidiary material layer 102' are cut by the cutting part 30a of the end mill 30 (refer to FIG. 7D).

FIG. 7D shows a modeling material layer 104' after the modeling material layer 104 (refer to FIG. 7C) is cut by the end mill 30, in which a boundary line of the modeling material layer 104' having a predetermined 3D configuration and the subsidiary material layer 102' cut by the end mill 30 is shown by a heavy line.

Machined powder generated when the cutting part 30a of the end mill 30 cut the modeling material layer 104' and the subsidiary material layer 102' is flushed with water supplied from the vicinity of the tip end of the spindle by a feed-water system (not shown) and flows in the collection box 20 provided around the outer periphery of the table 22.

The surface formed by the cutting operation is dried by removing water with air sprayed from the air nozzle (not shown). Since the modeling material constituting the modeling material layer 104 is the ultraviolet-curing resin which is insoluble in water, it does not dissolve in water flow, so that each configuration of the modeling material layer 104 and the modeling material layer 104' can be maintained.

After the surface of the modeling material layer 104' and the subsidiary material layer 102' is cleaned up with water and dried, the same processes shown in FIGS. 7A to 7D are performed under the control of the microcomputer based on predetermined data to form a subsidiary material layer 106 (refer to FIG. 7E), and a subsidiary material layer 106' is formed by cutting the subsidiary material layer 106 (refer to FIG. 7F). Then, a modeling material layer 108 is laminated on the subsidiary material layer 106' (refer to FIG. 7G), and the laminated modeling material layer 108 and the subsidiary material layer 106' are cut to form a modeling material layer 108' (refer to 7H).

Then, a 3D object 100' (refer to FIG. 7H) which are multilayered body consisting of the subsidiary material layer 102', modeling material layer 104', subsidiary material layer 106' and the modeling material layer 108' is constituted such that the 3D configuration of the subsidiary material layer 102' is transferred to the modeling material layer 104', and the 3D configuration of the subsidiary material layer 106' is transferred to the modeling material layer 108'. Thus, the modeling material layer 104' and the modeling material layer 108' form a 3D molded object 100 shown in FIG. 7I.

Then, the molded object 100' is removed from the upper face 22a of the table 22 and heated up to a predetermined temperature. Thus, the low melting point alloy comprising the subsidiary material layer 102' and the subsidiary material layer 106' is melted by heat and removed. Thus, the 3D molded object 100 (refer to FIG. 7I) consisting of the modeling material layer 104' and the modeling material layer 108' is provided.

According to the present invention, since the a minimum amount of subsidiary material or modeling material is applied precisely in the form of dots, the cutting amount by the end mill 30 in the following process can be reduced to a minimum as well as amounts of the subsidiary material and the modeling material can be reduced. That is, since the minimum necessary amounts of the subsidiary material and the modeling material are applied and the minimum necessary amount is cut repeatedly, a time for making the 3D molded object can be reduced.

In addition, according to the present invention, since the material such as the subsidiary material or the modeling material is supplied drop by drop to form small dots (refer to FIG. 8), an influence of expansion and contraction when it is cured can be considerably small. As a result, deformation after curing can be small and the warpage which was generated in the conventional 3D molded object (refer to FIG. 2B) can be prevented, so that there is provided a high-quality 3D object.

Furthermore, since the material is applied little by little in the forms of dot, a time required for solidifying the low melting point alloy by natural cooling and a time required for curing the ultraviolet-curing resin with ultraviolet rays can be short, so that the 3D object can be manufactured in a short time.

Figure 1B:
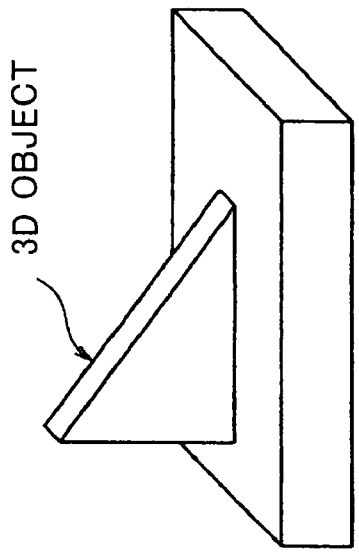
FIG. 1B is a schematic view showing a 3D molded object to be made.
Figure 1C:
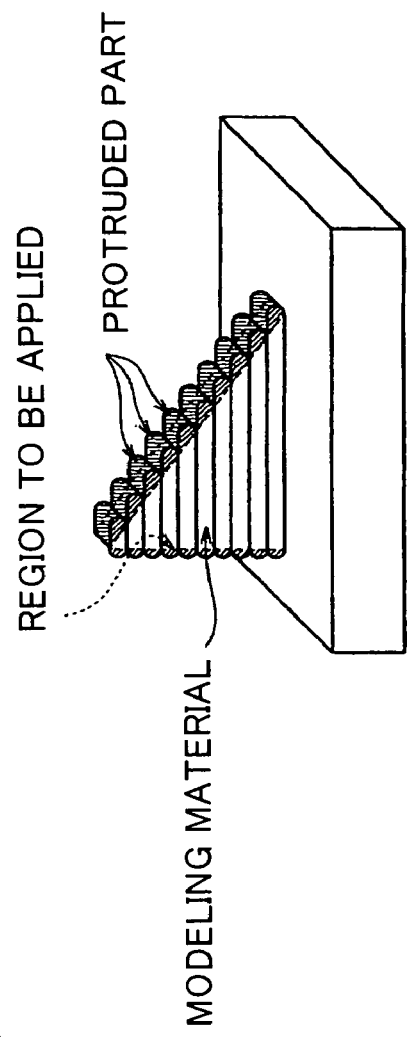
FIG. 1C is a view showing a state in which the linear application is performed to make the 3D molded object shown in FIG. 1B.
Figure 1A:
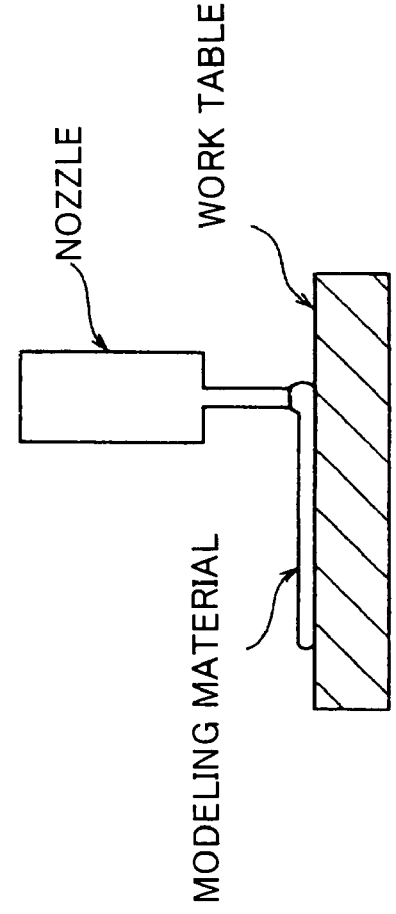
FIG. 1A is a view for explaining a conventional linear application method by a nozzle.

Still furthermore, according to the present invention, since the subsidiary material or the modeling material is applied drop by drop in the form of dot, the outlets 24a and 26a of the dispensers 24 and 26, respectively can be apart from the region where those materials are applied (refer to the distances W1 and W2 in FIGS. 8A and 8C). That is, it is not necessary to bring the tip end of the nozzle considerably close to a worktable unlike the conventional example (refer to FIG. 1A). Thus, according to the present invention, the outlets 24a and 26a of the dispensers 24 and 26, respectively are prevented from being damaged because they do not come in touch with the upper face 22a of the table 22. Still further, according to the present invention, since it is not necessary to largely move the dispensers 24 and 26 in the Z-direction, its control can be simplified. Further, according to the present invention, the material can be applied to the deep position in which the material could not be applied linearly in the conventional method (refer to FIG. 1A) because the nozzle could not come close to it.

Furthermore, according to the present invention, the dispensers 24 and 26 do not damage the manufactured part because they do not come in touch with the molded part, and there is provided a further high-quality 3D molded object.

According to the 3D modeling device 10 of the present invention, since the heater 40 is provided over the whole length of the syringe 24b in the dispenser 24 in which the subsidiary material is stored, the subsidiary material stored in the syringe can be stably heated up to the predetermined temperature and the low melting point alloy of the subsidiary material can be stably applied in the form dots or close to dots.

According to the 3D modeling device 10 of the present invention, since the light guide member 42 is provided on the lower side of the outlet 26a of the dispenser 26, the outlet 26a is not irradiated with the ultraviolet rays and the resin is prevented from curing in the vicinity of the outlet 26a of the dispenser 26, so that the outlet can be prevented from being clogged.

Still further, according to the present invention, the outlet 26a of the dispenser 26 which applies the modeling material and the light guide member 42 which emits the ultraviolet rays are aligned in the same axis direction, that is, the Z-direction. Therefore, the drop of the ultraviolet-curing resin discharged from the outlet 26a positioned in the through hole 42h falls in the spot of the converged ultraviolet rays just under the slot 42h of the light guide member 42, so that the application of the modeling material, the irradiation with the light and the hardening of the modeling material can be performed in one process (refer to FIG. 9A).

Figure 9A:
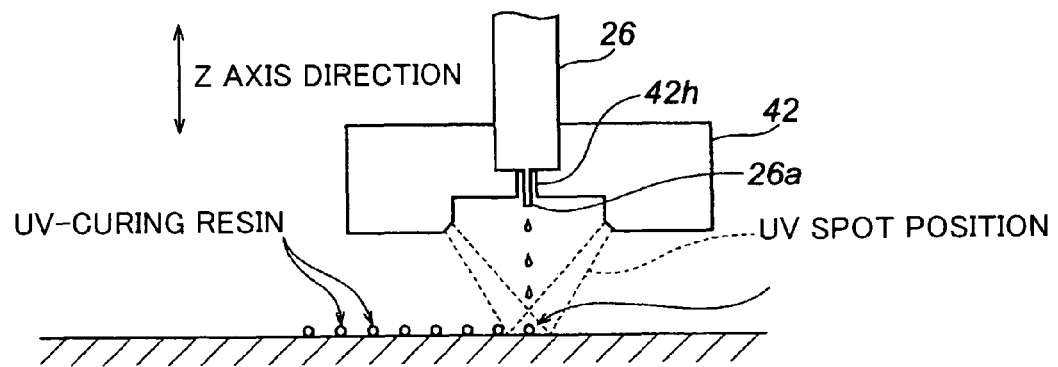
FIG. 9A is a schematic view showing a method of supplying a material according to the present invention.

The distance between the outlet 26a and the ultraviolet rays just under the outlet shown in FIG. 9A, that is, a distance corresponding to the distance W2 shown in FIG. 8C can be set about 10 mm.

Figure 9B:
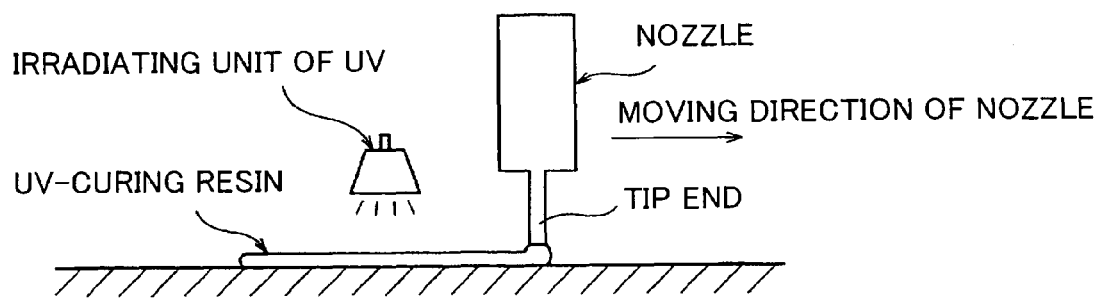
FIG. 9B is a schematic view showing a conventional method of supplying a material manually.

Meanwhile, when the ultraviolet-curing resin is applied and irradiated with the ultraviolet rays in the conventional linear application (refer to FIG. 1A), for example, if the ultraviolet rays are irradiated while the ultraviolet-curing resin is applied from the nozzle, the ultraviolet-curing resin is cured at the tip end of the nozzle and the nozzle is clogged. Therefore, irradiating units of the ultraviolet rays is provided on the rear side in the direction of movement of the linear application as shown in FIG. 9B instead of providing the irradiating units just under the tip end of the nozzle, and it is necessary to separate the step of applying the ultraviolet-curing resin from the nozzle and the step of curing the ultraviolet-curing resin with the ultraviolet rays. However, since it is not necessary to separate the steps in the present invention unlike the conventional technique, the 3D molded object can be made in a short time.

In addition, according to the 3D modeling device 10 of the present invention, the machined powder generated when the cutting part 30a of the end mill 30 serving as a cutting tool cuts the subsidiary material or the modeling material flows in the collection box 20 provided around the outer periphery of the table 22. Therefore, according to the present invention, since the machined powder is collected in the collection tank connected to the collection box 20 through the drain pipe (not shown), the machined powder can be easily collected. This is especially preferable when the powder of expensive metal is collected and recycled.

The above embodiment may be varied as described in the following examples (1) to (5).

(1) Although both subsidiary material and the modeling material are supplied in the form dots or close to dots in the above embodiment, the present invention is not limited to the above. Even when only the subsidiary material or only the modeling material is supplied in the form of dots or close to dots, the material can be applied with high precision.

Although the subsidiary material is supplied so as to be sequentially connected in the form of dots in line as show in FIGS. 8A and 8B, and then the modeling material is supplied so as to fill in the space which were formed dots applied before as shown in FIGS. 8C and 8D, the present invention is not limited to the above. The subsidiary material may be supplied as shown in FIGS. 8C and 8D and the modeling material may be supplied as shown in FIGS. 8A and 8B. Alternatively, both subsidiary material and modeling material may be supplied as shown in FIGS. 8A and 8B or as shown in FIGS. 8C and 8D.

(2) Although the low melting point alloy is used as the subsidiary material and the ultraviolet-curing resin which is insoluble in water is used as the modeling material, the present invention is not limited to the above. Various kinds of materials may be used as the subsidiary material and the modeling material.

For example, as the subsidiary material, a low melting point resin such as thermoplastic resin like wax may be used, and as the modeling material, a light-curing resin which is cured by visible light of radiant ray other than the ultraviolet or electron beams or other lights and insoluble in water may be used.

Thus, depending on the kind of the subsidiary material or the modeling material, various kinds of constitutions required for supplying the materials in the form of dots are to be provided such that the heater 40 may be another heating device, or the optical fiber 50 may be another optical irradiation device. A cutting tool different from the end mill 30 may be used or an apparatus for supplying a light source or cooling gas for hardening the subsidiary material or the modeling material may be provided.

For example, a linear heater may be provided at an engaging part 42k which radiates outward from an outer periphery of an upper recess 421 in the upper face 42e of the light guide body part 42a in order to heat up the outlet 26a of the dispenser 26. When the outlet 26a is heated up by the heater, viscosity of the light-curing resin can be lowered, so that the discharge of the dispenser can be easy and stable.

The kind of liquid to remove the machined powder is changed to a solution which is suitable for cleaning, for example. Alternatively, the liquid may be a solution which is suitable for collecting and recycling the machined powder.

(3) The step of removing the subsidiary material to provide the 3D molded object (refer to FIGS. 7H and 7I) in the above embodiment may be implemented in a system in the 3D modeling device or may be implemented in a system outside the 3D modeling device.

(4) The relative positional relation is not limited to the above embodiment, and the relation between the subsidiary material layer and the modeling material layer formed on a moving unit such as the table 22, and the dispensers 24 and 26 and the like may be changed in 3D directions.

For example, the moving unit such as a milling machine which fixes a processed object may be moved in the X-direction and Y-direction and the dispenser and the like may be moved in the Z-direction. Alternatively, the dispenser may be fixed and the moving unit on which the subsidiary material layer and the modeling material layer are formed may be moved in the X-direction, Y-direction and Z-direction.

(5) The above-described embodiment, the above examples (1) to (4) may be appropriately combined.

The present invention can be used in a 3D processing machine such as a modeling machine or a 2D carving machine which performs a cutting operation with a tool when a part or a design model is manufactured in trial or mass production.

What is claimed is:

1. A 3D modeling method comprising:
    a step of repeatedly cutting a subsidiary material layer formed of a subsidiary material and cutting a modeling material layer formed of a light-curing resin as a modeling material;
    a step of irradiating the light-curing resin with light; and
    a step of removing the subsidiary material to form a 3D object formed of the modeling material,
    wherein at least one of the subsidiary material constituting the subsidiary material layer and the modeling material constituting the modeling material layer is supplied in the form of dots,
    wherein the light is irradiated at an elevation beneath a position where the light-curing resin is discharged during depositing thereof,
    wherein the light is irradiated from a light guide member, wherein the light-curing resin is discharged from an outlet of a dispenser, and wherein the outlet of the dispenser is provided within a hole in the light guide member,
    wherein the light guide member includes a plurality of optical fibers having tip ends positioned around and lower than the outlet of the dispenser, and
    wherein said tip ends are provided in a ring around the outlet of the dispenser.

2. A 3D modeling method comprising a step of repeatedly cutting a subsidiary material layer formed of a subsidiary material and cutting a modeling material layer formed of a modeling material and a step of removing the subsidiary material to form a 3D object formed of the modeling material, said method further comprising:
    supplying the subsidiary material in the form of dots constituting the subsidiary material layer, wherein the subsidiary material is deposited drop by drop and is discharged to drop onto a predetermined position;
    supplying a light-curing resin in the form of dots as the modeling material constituting the modeling material layer, wherein said supplying of the light-curing resin in the form of dots comprises depositing the light-curing resin in the form of dots at spaced intervals from one another and then depositing the light-curing resin in the form of dots within spaces between the spaced intervals; and
    irradiating the supplied dot-shaped light-curing resin with light,
    wherein the light is irradiated at an elevation beneath a position where the light-curing resin is discharged, wherein the light is irradiated from a light guide member, wherein the light-curing resin is discharged from an outlet of a dispenser, and wherein the outlet of the dispenser is provided within a hole in the light guide member.

3. The 3D modeling method according to claim 2, wherein the light guide member includes a plurality of optical fibers having tip ends positioned around and lower than the outlet of the dispenser.

4. A 3D modeling method comprising a step of repeatedly cutting a subsidiary material layer formed of a subsidiary material and cutting a modeling material layer formed of a modeling material and a step of removing the subsidiary material to form a 3D object formed of the modeling material, said method further comprising:
    supplying the subsidiary material in the form of dots constituting the subsidiary material layer;

supplying a light-curing resin in the form of dots as the modeling material constituting the modeling material layer; and irradiating the supplied dot-shaped light-curing resin with light, wherein the light is irradiated at an elevation beneath a position where the light-curing resin is discharged, wherein the light is irradiated from a light guide member, wherein the light-curing resin is discharged from an outlet of a dispenser, and wherein the outlet of the dispenser is provided within a hole in the light guide member, wherein the light guide member includes a plurality of optical fibers having tip ends positioned around and lower than the outlet of the dispenser, and wherein said tip ends are provided in a ring around the outlet of the dispenser.

5. The 3D modeling method according to claim 3, wherein said tip ends are provided to irradiate light to converge at a spot beneath the hole of the light guide member.

6. The 3D modeling method according to claim 5, wherein the spot of converged light is axially aligned with the outlet of the dispenser.

7. A 3D modeling method comprising:

forming a subsidiary material layer by depositing a subsidiary material and cutting the subsidiary material, wherein the subsidiary material is deposited drop by drop;

forming a model material layer on the subsidiary material by depositing a light-curing resin as a modeling material, wherein said depositing of the light-curing resin includes depositing drops of the light-curing resin at spaced intervals from one another and then depositing drops of the light-curing resin within spaces between the spaced intervals;

irradiating the light-curing resin with light; and removing the subsidiary material to form a 3D object formed of the modeling material, wherein at least one of the subsidiary material constituting the subsidiary material layer and the modeling material constituting the modeling material layer is deposited as drops, and wherein the light is irradiated at an elevation beneath a position where the light-curing resin is discharged during depositing thereof, wherein the light is irradiated from a light guide member, wherein the light-curing resin is discharged from an outlet of a dispenser, and wherein the outlet of the dispenser is provided within a hole in the light guide member.

8. The 3D modeling method according to claim 7, wherein the light guide member includes a plurality of optical fibers having tip ends positioned around and lower than the outlet of the dispenser.

9. A 3D modeling method comprising:

forming a subsidiary material layer by depositing a subsidiary material and cutting the subsidiary material;

forming a model material layer on the subsidiary material by depositing a light-curing resin as a modeling material;

irradiating the light-curing resin with light; and removing the subsidiary material to form a 3D object formed of the modeling material, wherein at least one of the subsidiary material constituting the subsidiary material layer and the modeling material constituting the modeling material layer is deposited as drops, wherein the light is irradiated at an elevation beneath a position where the light-curing resin is discharged during depositing thereof, wherein the light is irradiated from a light guide member, wherein the light-curing resin is discharged from an outlet of a dispenser, and wherein the outlet of the dispenser is provided within a hole in the light guide member, wherein the light guide member includes a plurality of optical fibers having tip ends positioned around and lower than the outlet of the dispenser, and wherein said tip ends are provided in a ring around the outlet of the dispenser.

10. The 3D modeling method according to claim 8, wherein said tip ends are provided to irradiate light to converge at a spot beneath the hole of the light guide member.

11. The 3D modeling method according to claim 10, wherein the spot of converged light is axially aligned with the outlet of the dispenser.

* * * * *